Jan. 1, 1963
J. H. JACOBS
3,071,361
CUTTING TORCH
Filed March 17, 1960
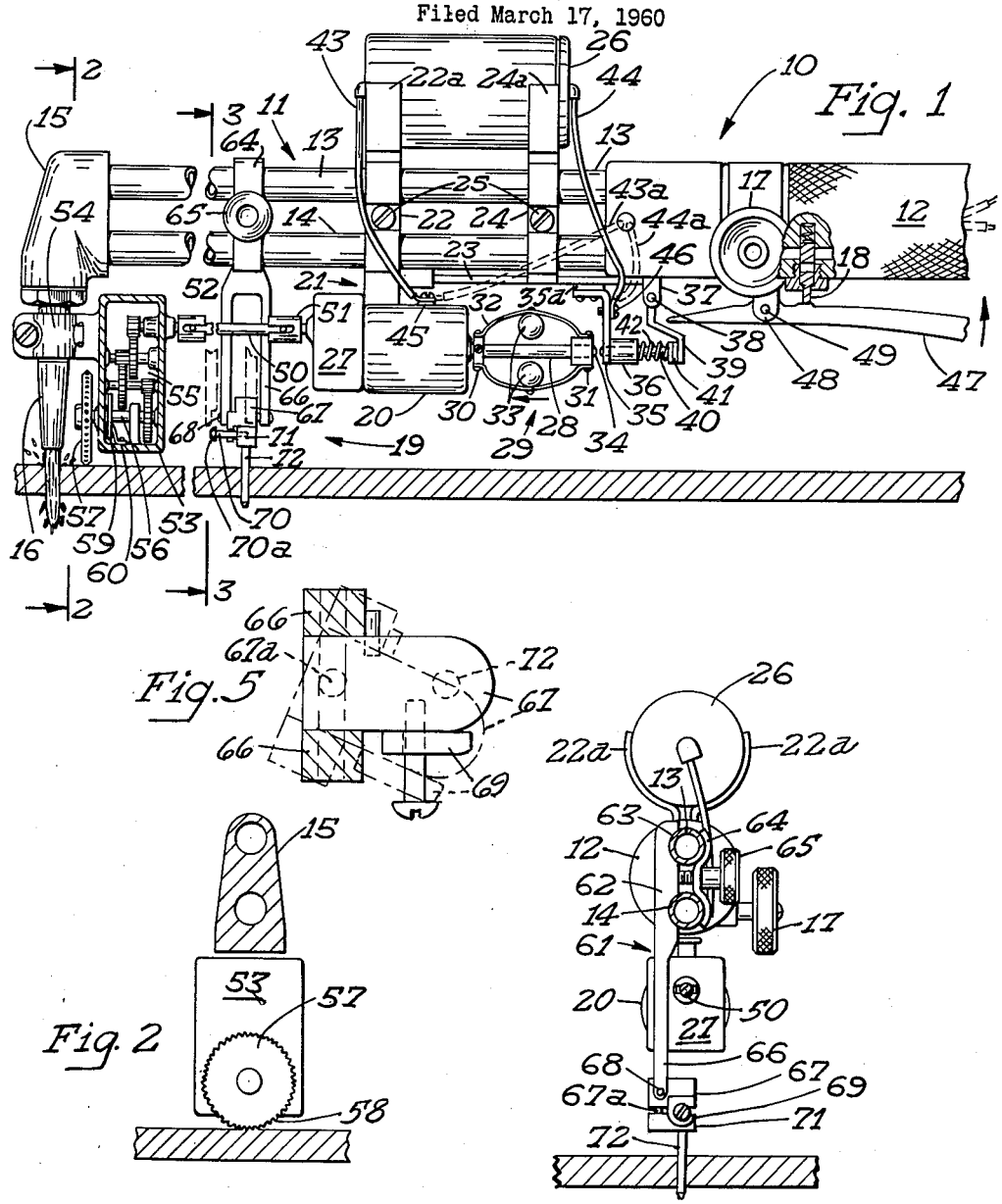
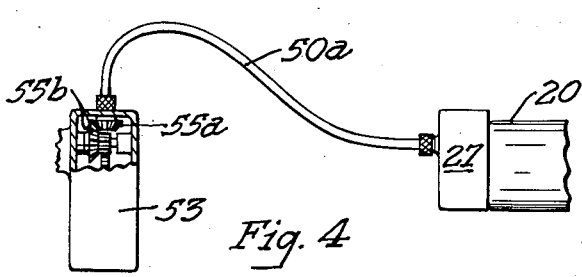
INVENTOR.
JOSEPH H. JACOBS
BY
Williamson, Schroeder & Palmatier
ATTORNEYS 3,071,361
CUTTING TORCH
Joseph H. Jacobs, Fort Myers, Fla., assignor to Jacobs Wind Electric Company, Fort Myers, Fla., a corporation of Montana
Filed Mar. 17, 1960, Ser. No. 15,640
8 Claims. (Cl. 266—23)

This invention relates to cutting torch apparatus and particularly for mechanism for guiding and propelling a cutting torch along a workpiece.

An object of this invention is to provide a novel cutting torch, of simple and inexpensive construction, including means for propelling and guiding the torch along the surface of the work.

Another object of this invention is to provide a novel carriage mechanism for use with cutting torches or the like and which is so arranged and constructed that the torch will be propelled and guided along the surface of the workpiece in a manner to cut the work more accurately and efficiently than in heretofore known torch structures.

A more specific object of this invention is to provide a novel propelling and guiding mechanism for torches and the like which includes a propelling carrier wheel engageable with the work for positioning the cutting tip at a predetermined height above the work and which includes control means operable in a manner to cause a cutting flame to be generated prior to driving of the carrier wheel whereby accurate cutting is insured.

Another object of this invention is to provide a novel self-propelled cutting torch apparatus of compact but sturdy construction including a pivotal support arranged and constructed to support the torch for rectilinear as well as pivotal movement to thereby permit various patterns to be cut with smooth even edges.

These and other objects and advantages of this invention will more fully appear from the following description, made in connection with the accompanying drawings, wherein like reference characters refer to the same or similar parts throughout the several views, and in which:

FIG. 1 is a side elevational view of my novel cutting torch fore shortened for the purpose of clarity and with certain parts thereof indicated in different positions by dotted line configuration;

FIG. 2 is a vertical section taken approximately along line 2—2 of FIG. 1 and looking in the direction of the arrows;

FIG. 3 is a vertical section taken approximately along line 3—3 of FIG. 1 and looking in the direction of the arrows;

FIG. 4 is a side elevational view of a modified form of the rotary motion transmitting means; and FIG. 5 is a cross section view taken approximately along line 5—5 of FIG. 4 and greatly enlarged for the purpose of clarity.

Referring now to the drawings, it will be seen that one embodiment of my novel cutting torch apparatus generally designated in its entirety by the reference numeral 10, may include a generally horizontal elongate torch assembly 11 which includes a handle 12 suitably formed of metallic material and which may be knurled for the purpose of facilitating the gripping thereof. Torch assembly 11 also includes a pair of elongate feed pipes or conduits 13 and 14 terminating at their respective ends in a head 15 which is offset 90° relative to the conduits 13 and 14 and which is provided with a conventional cutting tip 16.

Torch assembly 10 is provided with a conventional fuel regulating knob 17 which is positioned on the handle 12 and which, when rotated, will open and close valving in conduit 13 for permitting an acetylene fuel to be conducted therethrough from a suitable fuel supply. It is felt that while it is well known in the art that the acetylene gas which will be conducted through conduit 13 is actually the fuel which will be burned, a certain amount of oxygen will also be conducted through conduit 13 to support the combustion of this acetylene type fuel. When additional oxygen is fed to the cutting tip 16, combustion will take place more rapidly and the flame will become a cutting flame and a valve control means 18 is provided for controlling the flow of oxygen through conduit 14. Valve control means 18 includes a valve element 18a mounted for sliding movement within a recess 12a formed in handle 12 for opening the fluid passage 14a for supplying oxygen to conduit 14. Valve element 18a is retained in place within recess 12a by a nut 18b and is provided with an opening 18c. It will be seen that when valve element 18a is moved upwardly, the passage 14a will be opened. Valve element 18a, however, is normally urged downwardly to the closed position by a spring 18d.

One important feature of my torch apparatus includes a carriage mechanism generally designated as 19 and which serves to guide and propel the cutting torch 10 along the surface of a workpiece which is to be cut. This carriage mechanism 19 includes a source of rotary power in the form of a small electric motor 20 which is mounted to the conduits or pipes 13 and 14 by a bracket 21. This bracket 21 includes a pair of opposed clamping members 22 only one of which is shown and each of which terminates upwardly in arcuate clamped sections 22a which extend outwardly and upwardly as best seen in FIG. 3. Bracket 21 also includes an elongate plate 23 disposed substantially parallel with the feed pipe 14 and positioned therebelow. A second pair of opposed clamping arms 24 are affixed to and extend upwardly from plate 23, only one of which is shown and which terminate upwardly in arcuate clamping sections 24a of similar configuration as that of clamping section 22a. A pair of tightener screws 25 extend between the respective pairs of clamping arms and cooperate therewith for moving said arms towards and away from each other. A small dry cell type battery 26 is positioned within the clamping sections 22a and 24a of each of the clamps 22 and 24 and constitutes the source of the electric current used for operating the electric motor 20.

Motor 20 is provided with a conventional gear reduction box 27 affixed to the forward end thereof and the rotor shaft 28 of the motor which extends into the gear box 27 also extends rearwardly therefrom. This rotor shaft 28 is provided with a flyball type governor 29 for controlling the speed thereof. Flyball type governor 29 includes a collar 30 which is fixedly mounted on the shaft 28 and also includes a collar 31 positioned adjacent the rear end of the shaft and which is shiftably mounted thereon. A pair of spring members 32 have their respective ends secured to collars 30 and 31 and each is provided with a ball 33 affixed to the intermediate portions thereof. Flyball governor 29 is also provided with a contact button 34 which is carried by shiftable collar 31 as best seen in FIG. 1 of the drawing.

Plate 23 of bracket 21 has an L-shaped bracket 35 affixed thereto and which depends therefrom as clearly seen in FIG. 1. It will also be noted that a small strip of insulating material 35a is interposed between the L-shaped bracket and the plate 23, the purpose of which will become more apparent hereinafter. The downwardly depending arm of L-shaped bracket 35 is suitably apertured at the lower end thereof and is provided with a rearwardly extending sleeve 36. It will be noted that the rearmost end of plate 23 is provided with a pair of depending ears 37 only one of which is shown and an arm 39 is pivotally secured between the ears 37 by pivot pin 38. Arm 39, which is pivotable about an axis extending transversely of the torch apparatus 10, has a spring loaded plunger pin 40 carried by the lower portion thereof and which extends through sleeve 36. A small insulating element 41 is interposed between the lowermost portion of arm 39 and pin 40. A compression spring 42 is disposed around pin 40 and has its respective ends abutting against sleeve 36 and the head of the pin 40. Thus pin 40 is urged rearwardly of the torch apparatus and away from the shiftable collar 31 of flyball governor 29. The forwardmost tip of spring loaded pin 40 actually serves as an electrical contact and when it is urged into contact with the contact button 34 on the shiftable collar 31, the circuit to the electric motor 20 will be closed and the motor will thereby be energized.

Referring now to FIG. 1, it will be seen that battery 26 is provided with a lead 43 which is connected to the motor 20 as at 45 while ground lead 44 is connected to the L-shaped bracket 35 as at 46. It is also pointed out, however, that electrical current may be supplied to the electric motor by means of leads 43a and 44a which may be connected to a conventional wall socket or other source of electrical current by a conventional bayonet type plug. Thus it will be seen that the circuit to the motor will be closed only when plunger pin 40 is urged into engagement with contact button 34.

Means are provided for actuating a control switch defined by the plunger pin and the contact button of the shiftable collar of the flyball type governor 29 and this actuating means comprises an elongate lever 47 pivotally supported between a pair of ears 48 by a pivot pin 49. It will be noted that when the lever 47 is pivoted about its pivotal axis, the front end thereof will cam arm 39 forwardly to thereby urge pin 40 into engagement with the contact button 34 against the bias of spring 42. Thus the circuit to the electric motor 20 will be closed and the motor will be energized for rotating shaft 27.

It will also be noted that when lever 47 is initially pivoted, the lever will oscillate a small distance before making contact with the cam arm 39 as best seen in FIG. 1. It will also be noted that the other arm portion of lever 47 is in contact with the valve element 18a and that during this lost motion travel with respect to the arm 39, the valve element 18a will be urged upwardly. With this arrangement, it will be seen that the initial movement of lever 47 will completely open the oxygen passageway 14a prior to the energization of electric motor 20. This permits additional oxygen to be fed to the cutting tip 15 so that a cutting flame will always be generated prior to traversing movement of the torch along the surface of the workpiece.

Referring again to FIG. 1, it will be seen that rotary motion is transmitted from the electric motor 20 through the gear reduction box 27 to a rotary motion transmitting member 50 in the form of an elongate shaft.

It will be noted that shaft 50 is provided with universal joints 51 and 52 adjacent its rear and forward ends respectively. It will therefore be seen that these universal joints 51 and 52 give shaft 50 a reasonable degree of flexibility, the purpose of which will be described hereinafter. The forwardmost end of shaft 50 extends into a gear box 53 which is detachably mounted to the cutting tip 16 by means of a mounting member 54 which as seen in FIG. 1 comprises a clamp. Gear box 53 houses a gear train 55 comprised of a plurality of meshed gears which are driven by shaft 50 and which suitably reduce the speed so that a lower shaft 56 is arranged in driven relation with the gear train 55 and is rotated at a relatively slower speed than shaft 50. Shaft 56, which is suitably journalled on the lower portion of gear box 53, extends outwardly and forwardly of the gear box and is provided with a rotary traction element or carrier wheel 57 adjacent its forwardmost end.

Carrier wheel 57 which is rotatable with shaft 56, has a plurality of circumferentially arranged and radially extending small sharpened spikes 58. These spikes serve to permit better gripping of the wheel as it traverses the surface of a piece of metal to be cut and it has been found that the spikes must be sharpened to penetrate the scale usually found upon the surface of the metal and which if not penetrated will cause slippage and prevent accurate cutting. It is pointed out that since the carrier wheel 57 is disposed in such close proximity to the cutting tip, the wheel must be formed of material not affected by intense heat. Preferably, wheel 57 is formed of self-tempering high speed steel or similar material. It will also be noted that shaft 56 is also provided with a disc 59 affixed thereto for rotation therewith as is clearly seen in FIG. 1. A small leaf spring 60 is fixedly connected within the gear box 53 and engages disc 59 to effect a braking action thereon. This spring may be provided with a brake shoe at its disc engaging end and with this slight braking effect on the carrier wheel shaft 56, any lost motion or play between the gear teeth, which in the absence of such a braking mechanism results in a very noticeable unevenness in the cut edge, is completely precluded.

Another important feature of my invention includes a pivotable support apparatus adapted to be removably attached to the feed pipes 13 and 14 of the torch and which is designated by the reference numeral 61 in its entirety. This pivotal support 61 as seen in FIG. 2, engages the cutting torch apparatus 10 for supporting the cutting torch above the workpiece so that the cutting torch may be readily pivoted about any given radius thus permitting circular and arcuate cuts to be made. This pivotal support includes a torch-engaging member 62 having semi-circular recesses 63 formed therein for receiving feed pipes or conduits 13 and 14 respectively. The conduits 13 and 14 are clamped in place in recesses 63 by a clamping plate 64 and retained therein by a tightener screw 65 which extends into a threaded aperture suitably formed in the torch-engaging member 62. This torch-engaging clamping member 62 is bifurcated and extends downwardly to define a pair of arms 66 between which is pivotally supported a coupling means or hinge block 67. This hinge block 67 is pivotally supported between the bifurcated arms 66 by a pivot pin 68 for pivotal movement about an axis which extends substantially parallel with the general longitudinal axis of the cutting torch when the pivotal mount is so secured to the cutting torch. Hinge block 67 is provided with a downwardly extending arm 69 (see FIGS. 1 and 3) adjacent one end thereof and the lowermost portion of the arm is provided with a notch 69a for engagement with a horizontal limit pin 70 for support thereby. Pin 70 is provided with an enlarged head portion 70a at one end thereof and is also fixedly connected to the head portion 71 of a work-engaging member 72. It will be noted that work-engaging member 72 is in the form of a pin and is insertable in a previously drilled hole within a workpiece W so that the torch may be bodily pivoted about a predetermined radius when a circular pattern is to be cut.

A vertically extending pivot pin 67a connects hinge block 67 with the head 71 of pin 72 so that the hinge block and torch-engaging member 62 may be pivoted as a unit about pin 72. This vertical pivotal movement of the hinge block 67 and torch-engaging member as a unit relative to the head portions 71 of the pin 72 permits the torch-engaging member and hinge block to be pivoted forwardly on the work surface beyond the cutting radius. This is desirable to avoid leaving a notch or blemish along the circumference of a circular pattern. In most cutting operations when the torch is to be pivoted about a fixed radius, the torch is first positioned in place and a hole is melted in the metal as the initial step in the cutting operation so that the flame will cut through the metal. If a hole is melted at a point along the circumference of a circular cut, it will be seen that a blemish will be left in the circular pattern, but with my novel pivotal support, the torch is first urged forwardly as best seen in FIG. 5, so that there is oscillating shifting movement between the torch-engaging member and the work-engaging member which moves the cutting tip beyond the cutting radius. The hole is then melted in the metal and the torch is thereafter shifted rearwardly upon the fixed radius so that a circular pattern may be cut which results in no blemish or notch in the circumferential edge thereof. During bodily swinging movement of the torch assembly about the pivot support, slight rearward tension is constantly exerted thereon to avert any slippage of the carrier wheel.

It will also be noted that the clamping member 62 of my novel pivotal support will pivot about a pivot pin 68 relative to the hinge block 67 which permits the entire torch to be tilted about an axis extending substantially parallel to the general longitudinal axis of the torch. This tilting is especially desirable so that a smooth cut may be obtained when working on relative thin metal so that the cutting tip may be disposed in angulated position relative to the surface of the workpiece. My novel pivotal support may be adjusted to be positioned along the conduits 13 and 14 so that the radius thereof may be variously adjusted.

When my novel cutting torch apparatus is used to cut a circular pattern in a workpiece W about a fixed radius, the pivotal support 61 is secured to the cutting torch assembly 11 at the desired distance from the cutting tip. It is, of course, apparent that the distance between the cutting tip and the pivotal support 61 actually defines the radius about which the cutting torch will cut. After the pivotal support 61 is secured in place and is positioned in a small hole previously formed in the workpiece, the torch is urged forwardly so that the hinge block 67 and torch-engaging member 62 pivot as a unit about the vertical pivot pin 67a. This moves the cutting tip beyond the fixed radius and lever 47 is depressed slightly so that valve element 18a is moved to the open position and oxygen is supplied to the cutting tip. A cutting flame will therefore be generated and a hole is then melted in the workpiece. After such a hole is melted in the workpiece, the torch is urged rearwardly to oscillate about pivot pin 67a and slight downward pressure is exerted on the cutting torch by the user. Further depression of lever 47 will cause the forwardmost portion of the lever to move slightly downwardly into engagement with the cam arm 39 which results in the plunger pin 40 being urged forwardly. This forward movement of the cam arm 39 and pin 40 results in the pin 40 making contact with the contact button 34 on the flyball governor so that the circuit to the electric motor will be closed and the motor will thereby be energized. The rotary traction or wheel element 57 will be driven and the torch will be moved along the surface of the workpiece at a uniform speed. Thus it will be noted that the carrier wheel 57 will position the cutting tip at a predetermined height above the workpiece which will vary with the characteristic structure of the material being worked upon.

Further depression of the lever 47 will urge the shiftable collar 31 along the rotary shaft thus distorting or bowing the springs 32 of the flyball governor 29. This bowing of the springs 32 moves their respective balls 33 outwardly away from the shaft. As the weighted elements or balls are moved away from the shaft 28, the shaft will rotate faster thus driving the carrier wheel 57 at a faster rate along the surface of the workpiece. When the shaft 28 revolves beyond a predetermined speed, the ball elements 33 will be urged still further outwardly by the centrifugal force exerted thereon by rotation of the shaft 28 thus moving the shiftable collar 31 out of contact with the end of pin 40 so that the circuit to the motor is opened. When the motor 20 is de-energized, the speed of the carrier wheel will be slackened. Re-stated, the greater the force exerted against the shiftable collar 31 by the pin 40, which results in the shiftable collar 31 being moved along the rotor shaft 28, the greater is the speed required to move the shiftable collar out of contact with the plunger pin 40. It will therefore be seen that flyball governor 29 is variously adjustable to selectively regulate the speed of the carrier wheel so that the traversing movement of the torch apparatus may be readily controlled. The braking effect of the friction spring or elements 60 insures a smooth action of the carrier even in the event of lost motion or play between the teeth or enmeshing gears of the gear train 55. It will also be noted that the entire carrier mechanism is rather compact and of slim design and is adapted to be readily attached to a hand supportable type cutting torch. As an alternative form, a rotary motion transmitting member may be in the form of a highly flexible cable-type shaft 58 as shown in FIG. 4. The forward end of the flexible shaft 58 will terminate in driving relation with a bevelled gear 55a disposed within the gear box 53 and which is in turn in enmeshing relation with another bevelled gear 55b. Bevelled gear 55b will be arranged in driving relation with the gear train 55 and when flexible shaft 58 is rotated, the gear train will also be driven. By utilizing a cable-type drive member 58, it will be seen that a carrier wheel 57 along with gear box 53 may be readily adjusted relative to the cutting tip 16 of the cutting torch.

It will be seen from the foregoing paragraphs that I have provided a novel cutting torch apparatus including carriage means for readily propelling the torch along the surface of the workpiece to facilitate cutting of the metal. It will also be noted that because of the substantially elongate parallel relation between the torch assembly and the workpiece, a user can very accurately control the torch during the cutting operation. Inasmuch as the cutting torch assembly will be held in substantially horizontal and close spaced parallel relation to the surface of the workpiece to be cut plus the fact that the user's hand when so grasping the cutting torch will be disposed closely adjacent the workpiece, very accurate cutting may be achieved even when cutting intricate arcuate patterns. It will also be noted from the foregoing description that my novel carriage means is so arranged and constructed that accurate and efficient cutting can be achieved by a person with little or no experience with cutting torches. It will be further noted that my novel carriage mechanism is of such compact construction that it may be readily used with a hand type cutting torch and that the control mechanism is so arranged and constructed that a cutting flame is always insured before traversing movement of the torch.

It will, of course, be understood that various changes may be made in the form, details, arrangement and proportions of the parts without departing from the scope of my invention which consists of the matter shown and described herein and set forth in the appended claims.

What is claimed is:

1. Hand type cutting torch apparatus for use in cutting metals comprising, an elongate cutting torch assembly including a handle having a pair of fuel conduits projecting longitudinally therefrom and each being connectible to a source of gas under pressure, adjustable valve means shiftably mounted in flow-controlling relation with one of said fuel conduits and being shiftably between a normally conduit-closed position and a conduit-open position for controlling flow of gas therethrough, a hollow cutting tip carried by the front ends of said fuel conduits and extending angularly downwardly therefrom, said cutting tip being disposed in communicating relation with said conduits for receiving gas therethrough, a carrier wheel rotatably mounted on said cutting torch rearwardly of an in close proximity to the cutting tip for positioning the cutting tip at a predetermined heighth above the surface of a workpiece, the axis of rotation of the carrier wheel being disposed below and substantially parallel to the general longitudinal axis of said torch assembly, said carrier wheel cooperating with said handle to permit an operator when gripping the handle to support the torch assembly upon a workpiece solely by said carrier wheel;

power means mounted on said torch assembly and being drivingly connected to said carrier wheel for revolving the same, power control means for energizing and de-energizing said power means, adjustable speed regulating means operatively interrelated to said power means and being adjustable for selectively varying the speed of rotation of said carrier wheel, lever mechanism shiftably mounted on said torch assembly for movement between operative and inoperative positions to sequentially actuate the valve means, said lever being positioned in close proximity to said handle to thereby permit an operator to grip the handle and shift the lever with one hand, power control means and speed regulating means, said lever mechanism when shifted from said inoperative position to said operative position first interengaging and shifting said valve means to conduit-open position to permit the flow of gas to said cutting tip, and thereafter interengaging and actuating said power control means, said lever mechanism upon further movement in a direction towards said operative position and after actuating of said power control means, being operable to actuate said speed regulating means to thereby increase the speed of said carrier wheel.

2. The structure as defined in claim 1 wherein said one fuel conduit is connectible to a supply of oxygen under pressure whereby a cutting flame will be generated prior to movement of the cutting torch assembly along the surface of the workpiece.

3. The structure as defined in claim 1 wherein said carrier wheel is provided with a plurality of circumferentially arranged sharpened spikes extending radially therefrom.

4. The structure as defined in claim 1, including an elongate member having attachment means at the upper end thereof for ready connection to the said conduits, an elongate work-engaging pin member engageable in upstanding relation with the surface of the work, means interconnecting said torch-engaging member and work-engaging pin member for relative movement therebetween, said means comprising a coupling member pivotally connected to the lower end of said torch-engaging member for relative pivotal movement therebetween about a substantially horizontal axis extending longitudinally of and substantially parallel to the cutting torch supported by said apparatus, said coupling member being pivotally connected to the upper end of said work-engaging pin member to permit limited horizontal pivoting of the coupling member and torch engaging member as a unit about a substantially vertical axis, and cooperating stop elements on said coupling member and work-engaging pin member respectively for limiting horizontal pivotal movement about said vertical axis of the coupling member relative to said work-engaging pin member whereby said torch-engaging, work-engaging and coupling members may be pivoted as a unit about a substantially vertical axis.

5. The structure as defined in claim 3 wherein said carrier wheel is provided with a plurality of sharp spikes extending radially from the circumferential edge thereof.

6. Hand type cutting torch apparatus for use in cutting metals, said torch apparatus comprising, an elongate cutting torch assembly including a handle having a pair of fuel conduits projecting longitudinally therefrom, one of said fuel conduits being connectible to a source of oxygen under pressure and the other of said fuel conduits being connectible to a source of fuel gas under pressure, adjustable valve means shiftably mounted in flow controlling relation with said one conduit and being readily shiftable between a normally conduit-closed position and a conduit-open position for controlling the flow of oxygen therethrough, a hollow cutting tip carried by the front ends of said fuel conduits and extending angularly downwardly therefrom, said cutting tip being disposed in communicating relation with said conduits for receiving gas discharged from the latter, a carrier wheel rotatably mounted on said cutter torch rearwardly of and in close proximity to the cutting tip for positioning the cutting tip at a predetermined height above the surface of workpiece, said axis of rotation of the carrier wheel being disposed below and substantially parallel to the longitudinal axis of the torch assembly, said handle when gripped by an operator permitting the operator to support the torch apparatus upon a workpiece solely by said carrier wheel, power means mounted on said torch assembly and being drivingly connected to said carrier wheel for revolving the same, power control means for energizing and de-energizing said power means, adjustable speed regulating means operatively interrelated to said power means and being adjustable for selectively varying the speed of rotation of said carrier wheel, an elongate lever pivotally mounted on said torch assembly handle and being positioned to permit a user to grip the handle and to shift the lever with one hand, said lever being pivotal for movement between operative and inoperative positions to sequentially actuate the valve means, power control means and speed regulating means, said lever mechanism when shifted from said inoperative position to said operative position during initial movement thereof, first interengaging and shifting said valve means to the conduit-open position to permit the flow of oxygen to said cutting tip, and thereafter sequentially interengaging and actuating the power control means, said lever upon further pivotal movement in a direction towards said operative position and after actuation of said power control means, being operable to actuate said speed regulating means and thereby increasing the speed of said carrier wheel.

7. Hand type cutting torch apparatus for use in cutting metals, said apparatus comprising, an elongate cutting torch assembly including a handle adapted to be gripped by a user for supporting and guiding the torch apparatus, said handle having a pair of elongate conduits projecting longitudinally therefrom, said conduits being disposed in substantially parallel relation and one being connectible to a source of oxygen under pressure and the other being connectible to a source of fuel gas under pressure, adjustable valve means shiftably mounted in flow controlling relation with said one conduit and being shiftable between a normally conduit-closed position and a conduit-open position for controlling the flow of oxygen therethrough, a hollow cutting tip carried by the front end of said conduit extending angularly downwardly therefrom, said cutting tip being disposed in communicating relation with said conduits for receiving therein gas and oxygen discharged by said conduits, a carrier wheel rotatably mounted on said cutting torch rearwardly of and in close proximity to the cutting tip for positioning and supporting the cutting tip at a predetermined heighth above the surface of a workpiece, the axis of rotation of said carrier wheel being disposed below and substantially parallel to the general longitudinal axis of the torch assembly, said carrier wheel and handle comprising the sole support means for said torch assembly, electric motor means mounted on said elongate torch assembly and being drivingly connected to a carrier wheel for revolving the same, electrical circuit means for supplying electrical current to said motor means, switch means for opening and closing said circuit means, adjustable speed regulating means operatively interrelated to said motor means and being adjustable for selectively varying the speed of rotation of said carrier wheel, an elongate lever pivotally mounted on said torch assembly for movement between operative and inoperative positions to sequentially actuate the valve means, switch means and speed regulating means, said lever being positioned in close proximity to said handle to permit an operator to grip the handle and shift the lever with one hand, said elongate lever during initial movement thereof when shifted from said inoperative position to said operative position first interengaging and shifting said valve means to the conduit-open position to permit the flow of oxygen to said cutting tip, and thereafter interengaging and closing said switch means thereby energizing said motor means, and said elongate lever upon further pivotal movement in a direction away from said inoperative position and after closing of said switch means, being operable to actuate said speed regulating means to thereby increase the carrier wheel.

8. The structure as defined in claim 7 wherein said speed regulating means is arranged and constructed to open said switch means in response to centrifugal force when said electric motor exceeds a predetermined speed.

References Cited in the file of this patent

UNITED STATES PATENTS

| | | |
|---|---|---|
| 1,514,650 | Bucknam | Nov. 11, 1924 |
| 1,931,696 | Hedenstrom | Oct. 24, 1933 |
| 2,206,969 | McNutt | July 9, 1940 |
| 2,244,822 | Bucknam | June 10, 1941 |
| 2,578,132 | Garrett | Dec. 11, 1951 |
| 2,852,245 | Lamb | Sept. 16, 1958 |